United States Patent
Handschuh et al.

(10) Patent No.: US 9,849,623 B2
(45) Date of Patent: Dec. 26, 2017

(54) HOLLOW PART MANUFACTURING MACHINE

(71) Applicant: KRONES AG, Neutraubling (DE)

(72) Inventors: Eduard Handschuh, Donaustauf (DE); Paul Brinster, Regensburg (DE); Thomas Hoellriegl, Teublitz (DE); Christoph Brandl, Willmering (DE)

(73) Assignee: KRONES AG (DE)

( * ) Notice: Subject to any disclaimer, the term of this patent is extended or adjusted under 35 U.S.C. 154(b) by 286 days.

(21) Appl. No.: 14/918,347

(22) Filed: Oct. 20, 2015

(65) Prior Publication Data
US 2016/0107368 A1   Apr. 21, 2016

(30) Foreign Application Priority Data
Oct. 20, 2014   (DE) .................. 10 2014 015 416

(51) Int. Cl.
*B29C 49/42*   (2006.01)
*B29C 49/46*   (2006.01)
(Continued)

(52) U.S. Cl.
CPC .............. *B29C 49/60* (2013.01); *B29C 49/18* (2013.01); *B29C 49/4284* (2013.01);
(Continued)

(58) Field of Classification Search
CPC . B29C 49/5803; B29C 49/58; B29C 49/4289; B29C 49/16; B29C 2049/465;
(Continued)

(56) References Cited

U.S. PATENT DOCUMENTS

| | | | |
|---|---|---|---|
| 7,674,108 B2 | 3/2010 | Lemaistre | 425/535 |
| 8,657,598 B2 * | 2/2014 | Zacche' | B29C 49/783 251/63 |
| 8,708,690 B2 | 4/2014 | Knott et al. | 425/535 |

FOREIGN PATENT DOCUMENTS

| | | | |
|---|---|---|---|
| DE | 202004018237 | 3/2005 | B29C 49/78 |
| DE | 102007044641 | 4/2009 | E21D 23/16 |

(Continued)

OTHER PUBLICATIONS

Extended European Search Report (no translation) issued in application No. 15190605.4, dated Mar. 4, 2016 (5 pgs).
German Search report for corresponding German Patent Application Serial No. 10 2014 015 416.5, dated Sep. 25, 2015 (7 pages).

*Primary Examiner* — Robert B Davis
(74) *Attorney, Agent, or Firm* — Hayes Soloway P.C.

(57) ABSTRACT

Hollow part manufacturing machine includes at least one mold in which hollow parts can be manufactured by application of a pressurized medium, a valve unit, having at least two valves, wherein an inlet of a second valve is connected to a second pressure accumulator, which is pressurized under a second pressure, and an outlet of the second valve is connected to a blow nozzle via a channel. The inlet of a first valve is connected to a first pressure accumulator that is under a first pressure and the outlet of the first valve is also connected to the blow nozzle via a channel. During at least a part of the molding process, the blow nozzle seals the material to be molded, and/or the mold, relative to the environment.

26 Claims, 10 Drawing Sheets

(51) Int. Cl.
  *B29C 49/60* (2006.01)
  *B29C 49/18* (2006.01)
  *B29C 49/06* (2006.01)
  *B29K 67/00* (2006.01)
  *B29K 105/00* (2006.01)
  *B29L 31/00* (2006.01)

(52) U.S. Cl.
  CPC .......... *B29C 49/4289* (2013.01); *B29C 49/46* (2013.01); *B29C 49/06* (2013.01); *B29C 2049/4697* (2013.01); *B29C 2049/6054* (2013.01); *B29K 2067/003* (2013.01); *B29K 2105/258* (2013.01); *B29L 2031/7158* (2013.01); *Y02P 70/269* (2015.11); *Y02P 70/271* (2015.11)

(58) Field of Classification Search
  CPC .... B29C 2049/4652; B29C 2049/4664; B29C 49/46
  See application file for complete search history.

(56) References Cited

FOREIGN PATENT DOCUMENTS

| | | | |
|---|---|---|---|
| DE | 10 2011 008 173 | 12/2012 | ............. B29C 49/42 |
| DE | 102012214564 | 3/2013 | ............. F15B 1/027 |
| DE | 10 2012 010 985 | 12/2013 | ............. B29C 49/42 |
| EP | 2423543 A1 * | 2/2012 | ......... B29C 49/4289 |
| WO | WO-2012034953 A1 * | 3/2012 | ............. F16K 1/123 |

* cited by examiner

HOLLOW PART MANUFACTURING MACHINE

BACKGROUND OF THE INVENTION

The present invention relates to a hollow part manufacturing machine for manufacturing hollow parts, particularly plastic containers.

STATE OF THE ART

Hollow part manufacturing machines are generally known from the state of the art. For example, there are blowing machines for manufacturing plastic containers, e.g. PET bottles, in which a large number of blowing stations are arranged on a rotating transport wheel and in which heated pre-forms are continuously fed into the blowing station, in order to expand these against the inner wall of the blow mould by means of pressurised air once the blow mould has been closed and the pre-forms sealed. Here a further distinction can be made in principle, as to whether this is what is known as a single-step process, in which a blowing machine is connected to a pre-form manufacturing machine (e.g. by an injection moulding process, a compression moulding process or an extrusion process), such that, directly after the moulding thereof, the pre-forms can be further processed in a blowing machine, without further cooling, or whether it is what is known as a two-step process, in which, after the manufacturing process thereof, the pre-forms are first stored in the interim and are therefore available in a cold state and, in a further process step separate from this, are first heated by a heating device before the actual blowing process. Stationary blowing machines for manufacturing plastic containers are also known from the state of the art, most of which operate in cycles.

To provide the pressurised air, there is usually a valve unit on every blowing station, which controls the supplying of the blow air into and (usually) out of the hollow parts by means of valves.

It is also known to pre-blow said pre-forms with a first pressure, stretching them simultaneously, at least from time to time, by means of a stretching rod, and then finally blowing the pre-forms with a second pressure that is greater than the first pressure, wherein, for this purpose, two pressurised air accumulators, one for the first and one for the second pressure, are usually present and two valves of a valve unit assigned to the respective pressurised air accumulators are attached, in order to free the pipe from the pressurised air accumulator to the pre-form to be moulded. An additional valve is usually provided for supplying the pressurised air into a silencer.

The three valves are usually arranged in the valve unit, such that they all border on a mutual cavity which is connected to the hollow part via a blow nozzle which is movable relative to the hollow part.

Such a device is disclosed in document DE 10 2012 010 985 (A1) for example.

It is further known to control the volume flow of a medium into the hollow part to be inflated, by means of a proportional valve, in order to be able to adjust the volume flow continuously in a practical manner. However, controlling a proportional valve is very complicated and costly.

The object of the invention is to remove this drawback and provide as simple a valve as possible, with which different volume flows of the medium can be realised.

SUMMARY OF THE INVENTION

The invention refers to a hollow part manufacturing machine for manufacturing hollow parts, particularly plastic containers, comprising at least one mould in which hollow parts, particularly plastic containers, can be manufactured by means of the application of a pressurised medium, a valve unit, which has at least two valves, wherein an inlet of a second valve is connected to a second pressure accumulator, which is pressurised under a second pressure, and an outlet of the second valve is connected to a blow nozzle via a channel, wherein the inlet of a first valve is connected to a first pressure accumulator, which is pressurised under a first pressure, and the outlet of the first valve is also connected to the blow nozzle via a channel, wherein, during at least a part of the moulding process, the blow nozzle seals the material to be moulded, and/or the mould, relative to the environment, wherein the first valve has a valve housing, and, in the housing, a cavity is formed between the inlet and the outlet, through which, during the moulding process, the medium can be guided and in which at least a part of a switching element is arranged, with which an opening and a closing of the first valve can be carried out.

According to the invention, at least two flow paths, which are separated from each other by material of the housing and/or of the switching element, can be provided for the medium, between the inlet and the outlet of the first valve.

By providing two flow paths, it is possible to create two different cross-sections for the medium, either a) by providing the cross-section of a single flow path and providing both flow paths or b) by providing the cross-section of a single flow path and providing the cross-section of the other flow path, whereby the surfaces of the cross-sections of both flow paths differ. Preferably, three different cross-sections of all the flow paths can also be provided, if, in addition, both flow paths are provided at the same time in version b).

The cross-sections of the flow paths can be specified as fixed by the geometry of the switching unit and/or of the housing, and in particular can only be altered by reconstruction. In other words, the cross-sections cannot be continuously adjusted, as with a proportional valve for example. Instead, adjustment of the cross-sections on the basis of a step grid is possible.

Each of the two flow paths can be blocked and re-opened, for example separately, by the switching unit. One or both flow paths can also be blocked, depending on the flow conditions or pressure conditions in the inlet and/or outlet of the valve.

Moreover, by providing the two, preferably fixed, cross-sections of both flow paths, the drive of the first valve can be of a very simple design, since only discrete positions, that is, predetermined positions of the step grid, of the switching element have to be realised. The drive of the valve is preferably in the form of a pneumatic or hydraulic drive for example and realised via pilot valves.

The two flow paths can only be located in the valve and/or in the valve housing, that is, in this case both flow paths open into the same channel, which is connected to the outlet of the valve. In both cases the medium flows into the valve through the same inlet, independent of whether the first or the second flow path is being used.

Like the valve unit for example, the first and second valves can only be assigned to one mould in which the hollow part is expanded.

The pressure accumulators can also only be channels in which the pressurised medium can be transported. In a rotating blow wheel they are circular channels in particular.

The pressure in the second pressure accumulator can, for example, be higher than the pressure in the first pressure accumulator. Using the pressure in the second pressure accumulator for a final blowing of the hollow parts and the pressure in the first pressure accumulator for a pre-blowing is conceivable. Here, pre-blowing is seen as moulding up to 10-98% of the volume of the finished container.

Moreover, both channels in the valve unit can be the same channel, at least in areas. However, they are preferably channels which are separated from each other, at least in, areas, and which open into a mutual channel which is itself connected to the blow nozzle.

According to at least one embodiment of the hollow part manufacturing machine, it is provided that, in a first operating condition of the first valve (1), only a first of the two flow paths is provided for the medium. A pre-blowing can be carried out in this operating condition, during which the hollow part is only expanded in part by means of feeding the medium. Here, the medium flows from the inlet of the valve to the outlet of the valve via the first flow path. In particular, the flow path with the smaller cross-section is used.

According to at least one embodiment, it is provided that, in a second operating condition of the first valve, only a second of the two flow paths is provided for the medium. A recycling of the medium for example can be carried out in this operating condition, during which a part of the medium can be and/or is moved out of the preferably finally expanded hollow part back into the pressure accumulator, via the first valve. Here, the medium flows from the outlet of the valve to the inlet of the valve via the second flow path.

The medium here comes from the second pressure accumulator, via which it reaches the hollow part via the second valve and is therefore under a higher pressure in the hollow part than the pressure in the first pressure accumulator. Hence, in this operating condition, the medium can flow in another direction, that is, from the outlet of the valve to the inlet thereof, during a repeated opening of the first valve. In this case another flow path can then be/is then used as opposed to the one during the pre-blowing.

By positioning the switching element, the second flow path can in certain embodiments, still adopt a second, defined cross-section assigned thereto. This is preferably larger than the cross-section which was described previously. This is a fifth operating condition of the valve.

According to at least one embodiment, it is provided that, in a third operating condition of the first valve, both flow paths are provided for the medium at the same time. In this operating condition, a sterilising of the medium paths, and/or the two flow paths, can be carried out at the same time, preferably from the inlet of the valve to the outlet of the valve. However, in the third operating condition, the aforementioned recycling can also be carried out if as large a cross-section as possible is provided.

When sterilising the valve, supplying another medium which sterilises the channels and valves, instead of the medium used in a production mode of the machine, is conceivable. Known as a sterilisation mode, this mode is carried out at regular intervals for example and/or after a change of format (e.g. change of blow mould).

The sterilisation medium is a gaseous medium for example, gaseous hydrogen peroxide for example. Here it must be ensured that this does not condense in the channels of the valve unit, otherwise it is extremely difficult to discharge it (out of the machine). However, since the first flow path, which is used for the pre-blowing in particular (and/or also in the pre-blowing valves in the state of the art), can have too small a flow cross-section, so that the gaseous sterilising agent condenses after passing through the narrow cross-section; it is advantageous if, during the sterilisation, both flow paths are used, since a cross-section as large as this is available and a condensation of the sterilising agent can be prevented, in particular after the passing through of the first flow path in the channel to the blow nozzle.

According to at least one embodiment, it is provided that both the flow paths have different flow cross-sections with which, in at least two operating conditions, different volume flows of the medium can be realised.

According to at least one embodiment, it is provided that, in the first operating condition, a pre-blowing can be carried out, during which the hollow part can only be expanded in part by feeding the medium, and that, during the second operating condition, a recycling can be carried out, during which a part of the medium can be guided from the preferably finally expanded hollow part back into the pressure accumulator, via the first valve, and that, in the third operating condition, a sterilisation of the flow paths can be carried out, during which both the flow paths can be sterilised by a sterilisation medium at the same time.

It can also be considered that the hollow part manufacturing machine has a clean space with a low contamination-atmosphere and/or environment, in which the hollow parts can be manufactured, and the cavity of the first valve is connected in a fluidic manner to the clean space in the open condition of the valve, and that the switching element has bellows, via which a drive of the switching element is sealed, particularly sealed airtight, relative to the cavity. Application of the sterilisation medium to the drive of the valve is prevented by the sealing and can therefore be carried out more easily. In addition, germs from the drive cannot enter the channels of the medium.

According to at least one embodiment the manufacture and/or expansion of the containers takes place within a space with a low contamination-environment. The possible low contamination-environment can be a clean space which can be manufactured by one or a combination of the following measures for example:

The low contamination-environment of the device (in machine protection equipment) is subjected to excess pressure compared to the atmosphere of the environment (machine shop), by air filtered by fine filters being blown into the space, at least during production, The drives for all kinds of movements of the mould or of the blowing station are arranged outside the clean space, like, for example, the drives for the opening and closing of the cavity (mould) and/or the ones for moving a stretching rod and/or the ones for raising or lowering a container and/or the ones for moving a blow nozzle or filling nozzle, The inner walls of the space are cleaned and/or sterilised at regular intervals, for example via a spraying or vaporising with lye, acid or disinfection fluid or hydrogen peroxide (gaseous or liquid). In particular, the insides and outsides of the cavities, blow nozzles, filling nozzles, and stretching rods are included during cleaning and/or sterilisation. In particular, the inner walls of the machine protection equipment are also included.

The low contamination-environment is sealed relative to the atmosphere of the environment. In the case of a carousel, the sealing can be a water lock or a rubber seal, which seals the rotating part to the stationary part of the device.

According to at least one embodiment, the pre-forms are sterilised before being brought into the low contamination-environment.

According to at least one embodiment, the switching element has a valve piston and an additional element, for example a sleeve, which is movable relative to the valve piston, by means of the position relative to the valve piston in which a flow path can be opened, this flow path being possibly the first flow path. In another position the first flow path is blocked by this element.

According to at least one embodiment, the first flow path is located between this element and the valve piston.

According to at least one embodiment, the second flow path is located completely outside this element and/or the switching element and passes this by.

According to at least one embodiment, the second flow path is shorter than the first flow path. Hence the shortest connection from the inlet of the valve to the outlet of the valve can be identified via the respective flow path.

In particular, the valve piston can be movably arranged along a longitudinal axis and, for example, by closing the valve, is pressed against a seating surface (closing direction), in which the outlet of the valve is located, via the drive.

According to at least one embodiment, the angle between the second flow path and the longitudinal axis involves a larger acute angle than the first flow path.

As has already been mentioned, the movable element can be a sleeve which surrounds the valve piston preferably in a direction transverse to the moving direction of the valve piston, at least in areas.

According to at least one embodiment, the sleeve is arranged between the valve seat at the outlet of the valve and the valve piston, at least in areas. Where applicable, in its positions, the inner diameter of the sleeve is preferably smaller than the outer diameter of the piston at its end facing the valve seat.

The sleeve can be shaped like a hat for example. Then the hat can have a hole in its centre, in which the first flow path ends.

It can further be provided that the first flow path runs between the sleeve and the valve piston, and the second flow path between the housing and the sleeve. To provide the first flow path, the sleeve can have one or several recesses in its sheath. In particular, in the positions in which it surrounds the piston, the sleeve can have an inner diameter larger than the outside diameter of the piston and/or the piston skirt.

According to at least one embodiment, the sleeve is pre-tensioned relative to the valve piston, via a spring.

Then the spring can be arranged such that it pre-tensions the sleeve away from the valve piston in the direction of the valve outlet, using a force, the force of the spring preferably being less than a force of the medium onto the sleeve in the direction of the valve piston during a flowing back of the medium from the hollow part into the first pressure accumulator. In particular, the spring can be arranged between the sleeve and the piston skirt.

Alternatively or in addition to the pre-tensioning by the spring, the, for example hat-shaped sleeve can also be arranged on the piston, without a spring, by being only loosely pushed onto the piston skirt or being clipped onto the piston skirt, the clip still allowing the sleeve to move relative to the skirt.

According to at least one embodiment, the first valve can have a second piston, via which a stop for the sleeve or the valve piston can be shifted, the stop being moved in the direction of the outlet in the first and second operating conditions, causing that only one of the two flow paths can be used, and, in the third operating condition, sterilisation gas being supplied through both flow paths, and the stop being moved away from the outlet, so that both flow paths are freed.

According to at least one embodiment, in a fourth operating condition, each of the flow paths is interrupted by a fluid-impermeable sealing of the channel by the valve piston, a wall of the channel being in direct contact with the valve piston in this operating condition and the fluid-impermeable sealing being achieved due to this direct contact.

In other words, unlike the embodiment shown above, is as regards a sleeve, no movable element, particularly no movable sleeve, arranged between the outlet of the valve and the valve piston.

According to at least one embodiment, an outer surface of the valve piston forms in the area, which is surrounded in a direction transverse to a shifting direction of the valve piston and to the side of a movable element, for instance the sleeve, at least one entraining element, particularly in the form of a projection or in the form of a stop, which is arranged in a shifting and moving manner in a corresponding inner recess of the movable element.

The entraining element being formed as one piece together with the remaining element/s of the valve piston is conceivable. Alternatively, however, the entraining element being a separate component, which is loosely fixed mechanically, or tightly fixed mechanically, onto the element/s of the valve piston is also conceivable, for example in the form of a lateral sleeve.

According to at least one embodiment the movable element, for example the sleeve, and the valve piston can be coupled to each other mechanically, without pre-tensioning.

In particular, such a mechanically coupling without pre-tensioning can be executed in the form of a sliding bearing, at least in part. In any case, in this embodiment there are no pre-tensioning means, for example a pre-tension spring, for pre-tensioning the sleeve relative to the valve piston.

According to at least one embodiment the movable element, for example the sleeve, and the valve piston can only be in particular directly engaged mechanically via the entraining element.

This can mean that, apart from the entraining element, the valve piston is not in mechanical contact with any other area of the movable element, for example the sleeve.

According to at least one embodiment, in the fourth operating condition the entraining element sits on the first seating point (facing the valve seat) of the inner recess, on an inner wall of the movable element.

According to at least one embodiment, in the second and/or third operating conditions, the movable element is lifted off the valve seat by an engagement of the entraining element into a seating point (facing away from the valve seat) of the inner recess.

In this respect, both seating points can, in the shifting direction of the valve piston, demarcate the inner recess of the sleeve in a shifting direction upwards and/or downwards.

Instead of being moved between both the seating points of the inner recess in a sliding, mechanical manner, the entraining element can also be moved between both seating points without any contact.

This can mean that the valve piston, and particularly the entraining element thereof, does not come into mechanical contact with the sleeve while moving between both seating points.

Therefore this can further mean that, while the valve piston moves up and down like this, the entraining element is not guided by the sleeve in a sliding, mechanical manner, but rather that the entraining element only comes into contact with the same device point by point, on the seating points of the movable element. According to at least one embodiment, the sleeve has at least one restrictor bore in a side wall, whereby, in operating conditions one, two and three, the respective flow paths assigned thereto run through this restrictor bore. Here the side wall is such a wall of the movable element, which preferably only borders the valve piston, more preferably, in a lateral and circular manner. In this case, the type and form of the restrictor bore can be formed in relation to the first exemplary embodiment.

The movable element preferably joins the inner surface of the valve block, which faces the movable element, in an fluid-impermeable manner, for instance in the first and second operating conditions.

Further preferably, the same fluid-impermeable joining also applies with respect to the engagement of the movable element with an outer surface of the valve piston, so that, for example in the first and in the second operating condition, the medium can only leave the valve, through the restrictor bore.

This can advantageously ensure that the flow cross-section is the same in the first and in the second operating condition.

The invention is further directed to a method for manufacturing hollow parts in a mould by means of the application of a pressurised medium, wherein the medium is supplied via a valve unit, which has at least two valves, wherein an inlet of a second valve is connected to a second pressure accumulator, which is pressurised under a second pressure, and an outlet of the second valve is connected to a blow nozzle via a channel, wherein the inlet of a first valve is connected to a first pressure accumulator that is under a first pressure and the outlet of the first valve is also connected to the blow nozzle via a channel, wherein, during at least a part of the moulding process, the blow nozzle seals the material to be moulded, and/or the mould, relative to the environment, wherein the first valve has a valve housing, and, in the housing, a cavity is formed between the inlet and the outlet, through which, during the moulding process, the medium can be guided and in which at least a part of a switching element is arranged, with which an opening and a closing of the first valve can be carried out, characterised in that, between the inlet and the outlet of the first valve, the medium flows through at least two flow paths, which are separated from one another by material of the housing and/or of the switching element.

In particular, the switching element frees either the first, the second or both flow paths, depending on an operating condition of the valve, and in particular depending on the direction of flow of the medium through the cavity.

In particular, in a production mode, the medium only flows substantially via the first flow path during a pre-blowing of the hollow part, and, during a sterilisation mode, sterilisation medium flows via both flow paths.

In particular, in a production mode, during a recycling of medium, the medium only flows substantially back into a pressure accumulator via the second flow path.

The manufacture of a single container in the production mode is carried out particularly in the following steps in the specified sequence:
1) Introducing the mass to be formed into the mould
2) Sealing (could also be done before step 1))
3) Opening the first valve
4) Pre-blowing the mass through first flow path in the first operating condition of the first valve
5) Closing the first valve
6) Finishing forming the mass via the second valve under a higher pressure than during the pre-blowing
7) Relieving the remaining pressure
8) Removing the hollow part from the mould In step 4 the mass can also be stretched in a longitudinal axis of the hollow part with a stretching rod, at the same time.

In particular, a recycling is carried out between steps 6 and 7. This can particularly occur either via the first valve and the second flow path, or recycling into another pressure accumulator can occur via an additional valve of the valve unit.

The second valve is particularly a high pressure valve. The first valve can also be a high pressure valve.

In a production mode a compressible gas can also be used as a (pressure) medium. In particular, air, filtered air, sterile air, flammable gases like hydrogen, a mixture of water vapour and air, nitrogen, a mixture of sterilising agents and air or suchlike can be used. However, incompressible media, such as water, sterile water or product (coca cola, beer, tea) can also be used. Combinations of the aforementioned media are also possible. A hollow part can also be formed with various media one after the other. The media in different pressure accumulators can vary. Moreover, in a sterilisation mode, sterilisation media can be supplied through the valve. The sterilisation medium is preferably gaseous hydrogen peroxide or a mixture of this and another gas, in particular air. Alternatively or in addition, cleaning medium can be supplied through the valve, in which case this is, in particular, a fluid medium like lye for example.

The mass to be formed could also be pre-blown with compressible medium and then the forming finished with product. In this case a second pressure accumulator is not necessary, rather, the product is via the second valve and other pressure-producing means, for example a piston similar to a pump, into the hollow part.

The mass to be formed and/or the material to be formed can, for example, be a previously mentioned test-tube shaped pre-form made of plastic, particularly of PET, PP or another plastic, or even an extrusion blown tube or a glass drinking vessel like those used in glass blowing machines.

Inlet and outlet of a valve are generally understood to be a passage and/or an opening, through which the medium can flow in the desired direction. Depending on the application (time of the valve switching, pressure difference between the two sides), an inlet can also act as an outlet and vice versa. Here, the passage closer to the pressure accumulator in the flow direction should be regarded as the inlet.

In an alternative embodiment, the sealing in the first valve can also be executed at the inlet of the valve.

Sealable, and/or sealed, are understood to be the sealing of a hollow part via seals, such that substantially no medium can inadvertently escape into the atmosphere during the forming process.

The hollow parts to be formed are preferably bottles, but containers of any type can be produced by the hollow part manufacturing machine: canisters, hoses, tanks, containers, balls, cups, mugs and many more.

In the forming of PET bottles in the two-step process, the medium in the second pressure accumulator is typically under a pressure from 5 to 45 particularly from 15 to 35 bar. If the pre-blowing mentioned at the start is carried out using the first valve, the pressure in the first pressure accumulator is typically between 3 and 25 bar, particularly between 5 and 20 bar. The pressure specifications are not restrictive and can vary very much, depending on the material to be formed or characteristics of the finished hollow part.

In particular, a third valve is arranged parallel to the first and second valves in the valve unit, which is connected to an outlet for the medium into the atmosphere (preferably via a silencer).

In addition a fourth valve can also be arranged parallel to the first three valves, which is connected to a third pressure accumulator which is under a lower pressure than the second and particularly also than the first pressure accumulator.

Using pressure accumulators of lower pressure is not only necessary to control the inflation process (pre-blowing), but can also be additionally relevant to the recycling of the pressure medium, particularly with compressible media like air. Once the hollow part has finished forming under the highest pressure from the second pressure accumulator, by opening a valve which is connected to a pressure accumulator of less pressure, the medium can flow from the hollow part back into a pressure accumulator of less pressure before, at the end of the blowing process, the remainder of the medium left in the hollow part (and in the channels) is released into the atmosphere, or directly into the clean space via the blow nozzle.

In multi-step recycling, once the hollow part has been formed under the highest pressure, the valve in particular is opened, of which the assigned pressure accumulator has the second-highest pressure, then the valve, of which the assigned pressure accumulator has the third-highest pressure, etc. Expressed in other words, a cascade-formed pressure reduction takes place in the hollow part.

In the supplying of recycled medium from the pressure accumulators into the next hollow part to be formed in the blowing station, or into a hollow part of another blowing station of the hollow part manufacturing machine (if the pressure accumulators are connected to two blowing stations), the blowing pressure can again be accumulated in the hollow part in the form of a cascade. The valves are then opened in reverse sequence in comparison to the recycling. If medium is also supplied from an additional pressure accumulator into the hollow part between the pre-blowing and the final blowing, the aforementioned interim blowing is referred to. In this way a pressure gradient is always provided in the pressurised air, which enables the medium to flow into the hollow part.

In particular, the mass to be formed, is a hollow part with only one opening.

Moreover, two valves which can be opened at the same time, can also act as an outlet. One is used for safety in case the other fails.

Sealing the mass to be formed relative to the environment is provided particularly by a blow nozzle which, for sealing purposes, sits on the mould itself and/or on the mass to be formed. Depending on the embodiment, the sealing creates space on the mould, to arrange the valves, or, if the sealing is done on the mass to be formed, reduces the dead space, whereby the first does not exclude the second.

In particular, the valve unit can be fixedly connected to the blow nozzle. Hence a dead space can be reduced by lifting the blow nozzle in the sealing process.

The hollow part manufacturing machine is particularly a continuously operating stretch blow machine on which a large number of blowing stations are arranged and into which tempered, test-tube shaped pre-forms made of plastic, particularly PET, are fed and converted into hollow parts in the blowing stations. Here, the blowing stations can be arranged and evenly distributed around the circumference of a blow wheel. During the blowing, the pre-forms are continuously transported in the mould of the blowing station, along a circular transport path. In such hollow part manufacturing machines the pressurised air is guided from a compressor, which is arranged in a stationary manner, into a rotating part of the machine via a channel of a slewing ring and, particularly when using a purely recycling accumulator, via an additional channel in the slewing ring, is guided out again for further use. In some embodiments the compressor can also be located on the blow wheel.

Here all the means and embodiments of the description of the device can also be used in the method and vice versa, also those in the Figures

BRIEF DESCRIPTION OF THE DRAWINGS

In the following, exemplary embodiments are intended to describe the invention and its advantages in greater detail on the basis of the attached Figures. The proportions of the individual elements to each other in the Figures do not always correspond to the real proportions, since some forms are represented in simplified form and other forms are enlarged in relation to other elements for the purposes of better illustration.

The same reference numbers and/or geometries are used for the same elements of the invention or those having the same effect. Further, to give an overview, only the reference numbers which are required to describe the respective Figure are used in the individual Figures. The embodiments shown are merely examples of how the device according to the invention can be designed and are not exhaustive.

DETAILED DESCRIPTION OF THE INVENTION

Figure 1:
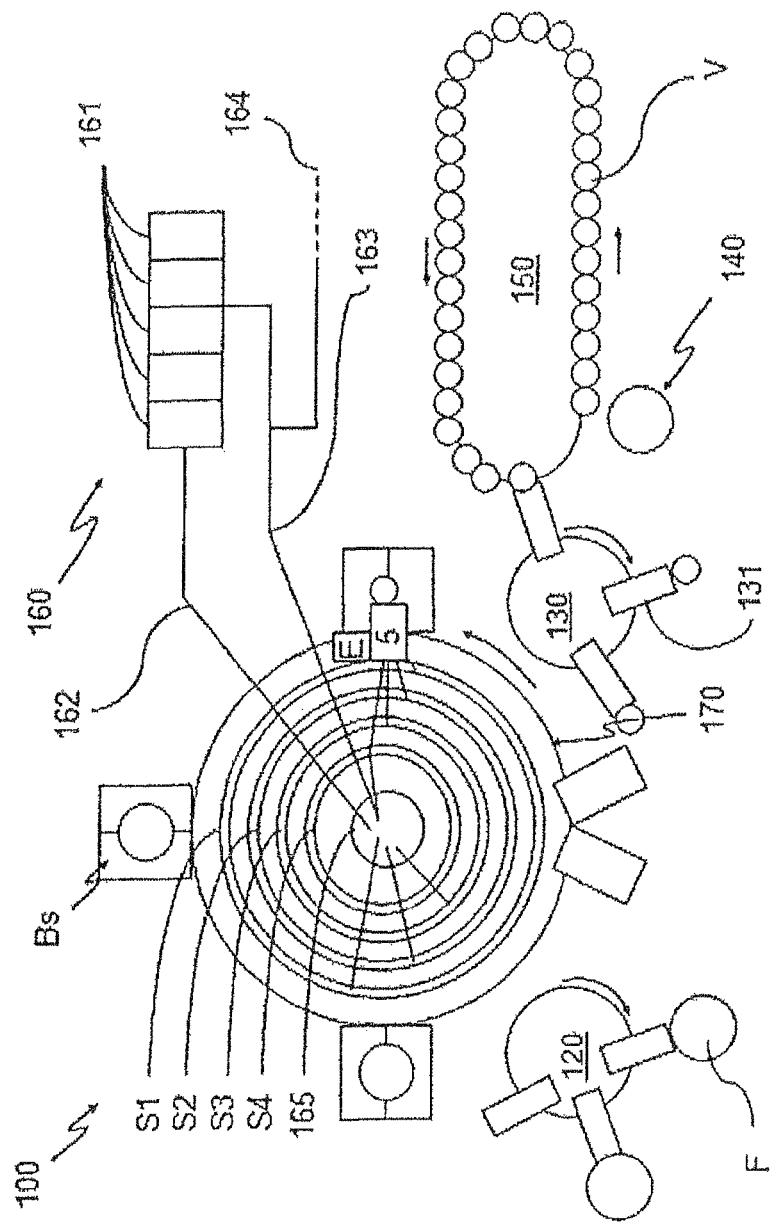
FIG. 1 shows a schematic plan view of a hollow part manufacturing machine according to the invention.

FIG. 1 shows a schematic plan view of a hollow part manufacturing machine 100. In this exemplary embodiment it is executed as a continuously operating stretch blow machine. Pre-forms V are fed via what is known as a saw tooth star 140 of a device for tempering 150, in which the pre-forms V are continuously fed through a heating tunnel (not shown in more detail) consisting of a large number of infrared radiators and facing reflectors, by means of heating mandrels arranged on a revolving chain. The device for tempering 150 can also be a carousel on the circumference of which a large number of heating stations like microwave resonators or hot pockets are attached (not shown). After the tempering, the pre-forms V are transferred by grippers 131, which revolve on an infeed starwheel 130, to a blow wheel 170, on the circumference of which a large number of blowing stations Bs are arranged. After the moulding process in the blowing station Bs, the finished-blown bottles F are removed by a discharge starwheel 120. Then the bottles F are transported in order to be labelled, filled and packed in outer packaging and/or palletised (not shown). The transport paths of the pre-forms V and the bottles F and/or the rotating directions of the individual elements are each indicated by arrows.

Located in front of the blow wheel 170, there is sterilising equipment (not shown) for sterilising the pre-forms V. Therefrom begins a clean space (not shown) which surrounds the transport path of the containers and which extends as far as a capper of the filling system.

The individual blowing stations Bs are supplied with a gaseous medium, here sterile pressurised air, via a compressor 160 with several compressor steps 161. In the first step (shown on the right) air is compressed to a pressure of, for example, 5 bar, in the next step to 10 bar and so on, until it has a pressure of 45 bar after the final step. Then the air is fed into a rotary distributor 165 via a filter (not shown) and a supply pipe 162, which connects the stationary part of the hollow part manufacturing machine 100 to the rotating part (blow wheel 170). Also on the rotary distributor 165 are several pressure reducers (not shown) which reduce the pressure, which is provided by the compressor 160, to different pressure levels for circular pipes S1 to S3, which are also arranged on the blow wheel 170. The circular pipes S1, S2, S3 also act as pressure accumulators and/or pressure distributors for the individual blowing stations Bs on the blow wheel 170. In circular pipe S3, the first pressure accumulator, a pre-blow pressure of, for example, 10 bar is provided, in circular pipe S2 an interim pre-blow pressure of, for example, 20 bar and in circular pipe S1, the second pressure accumulator, a final blow pressure of, for example, 35 bar. Each blowing station Bs here includes a valve unit 5, which is connected to the individual circular pipes S1, S2, S3 and which connects the individual circular pipes S1, S2, S3 to the pre-form V to be inflated. Once the pre-form V has been sealed by means of a blow nozzle 8 (next Figure), this is connected to the individual circular channels successively and in the following sequence: S1, S2, S3. After the final expansion, the air is taken out of the bottle F—still under the final blow pressure—first back into the circular channel S2, advantageously for as long as it takes for the pressure in the bottle F to nearly reach the pressure in the circular channel S2. Then the air in the bottle F—now just below the pressure in the circular channel S2—is fed into the channel S3. Using the pre-blow channel S3 first to return the air can also be advantageous if the intention is to ensure that a minimum pressure always be provided therein. Also, the time taken to return it can be regulated via the pressure in a channel S2, S3, S4 by means of a pressure sensor (not shown). The pressure reducers, which provide the pressure for the channels S2 and S3, could be dispensed with during production if sufficient quantity of air is recycled, although they are advantageous for starting up the blowing machine.

At this point, instead of letting the air escape into the atmosphere via an outlet E, the blow air is then fed back into the channel S4 again, up to a level of 3-5 bar. Since the pre-blowing out of channel S3 below a certain pressure, here of 10 bar, must represent the first step in the manufacture of the hollow part, the circular channel S4 is only used as an (interim) store of returned air from the bottle F and not for blowing in this exemplary embodiment due to its lower pressure level. From there, the air can either be made available to, for example, pilot valves 9 or other drives of the blowing stations Bs (e.g. a drive for stretching rods 60) still on the blow wheel 170, or be transported back into the stationary part of the machine via an additional pipe and by the rotary distributor 165 via pipe 163. From there, the air can be fed back into an interim step of the compressor 161 for example, or supplied to the workshop air system via pipe 164, or for other uses, such as a post-cooling of the bottle base or for a labelling machine or filling machine.

The circular pipes S1, S2, S3, S4 can also be circular in areas only. For example, a circular channel S1, S2, S3, S4 can also be formed from two semi-circular halves. The pressure accumulators are generally to be labelled S in the following.

In particular, the pressure accumulators S2 and S4 can be dispensed with.

The aforementioned outlet E is present on every station Bs and is used to discharge the remaining 3-5 bar in the bottle F before the blow nozzle 30 is started up again and the bottle F removed. In this case the pressure in bottle F is only released up to a bar excess pressure via the outlet E. After that, the outlet valve 50 is closed and the rest of the air discharged into the clean space via the blow nozzle 30. This ensures that no air can enter the interior of the clean space via the outlet.

Figure 2:
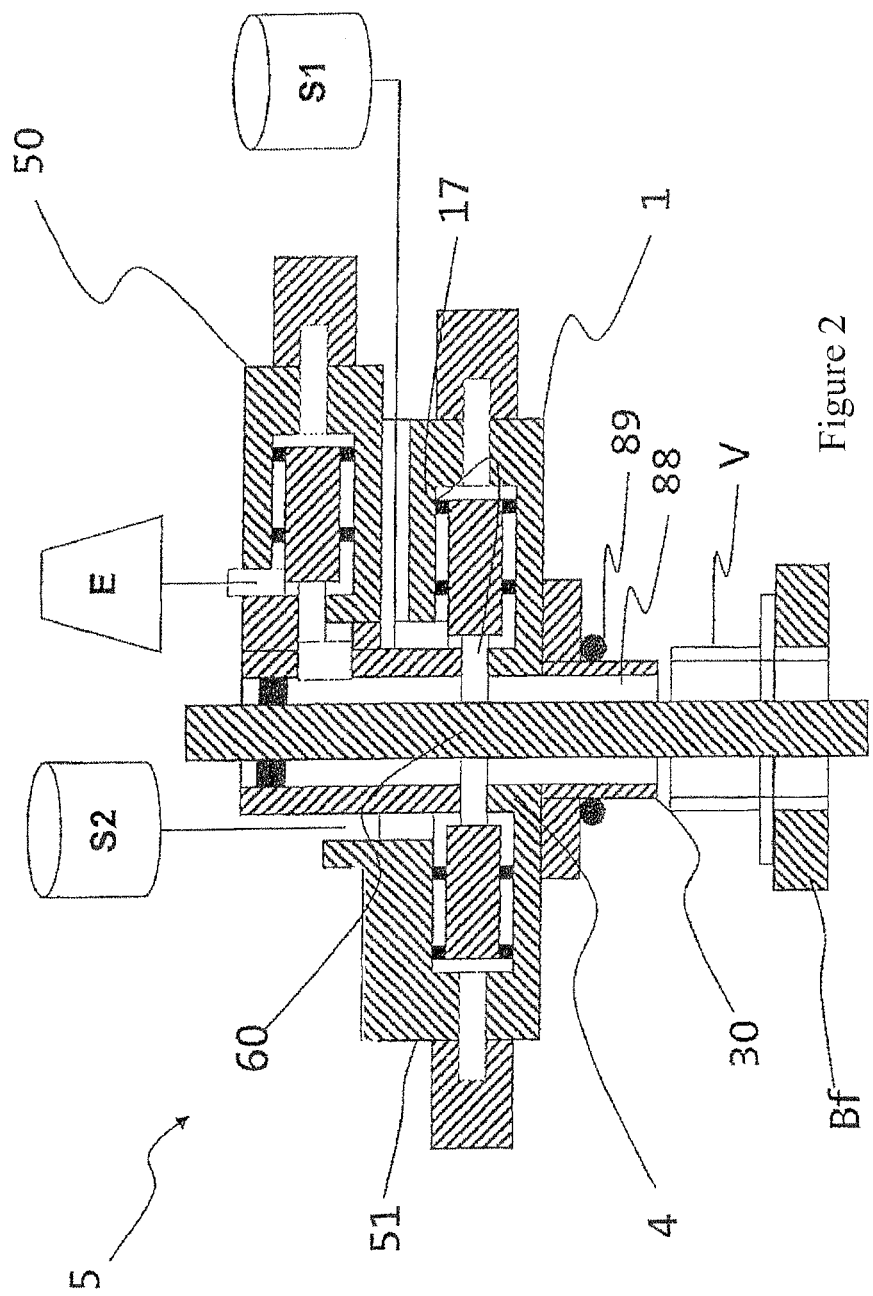
FIG. 2 shows an embodiment of the valve unit.

FIG. 2 shows an embodiment in which first and second valves 1, 51 and the outlet valve 50 are arranged on and/or in part in a mutual valve block 4. The valves 1, 51 and 50 are only suggested here. The valves 1, 51 are particularly arranged in a circular arrangement around the middle main flow channel 88, and/or around the extended axis of the hollow part V to be formed. The outlet valve 50 is arranged above the valve 1, preferably, however, this is arranged in the same circle as the valves 1 and 51 (behind the drawing plane). Additional valves can also be present in the same circle. The individual pressure accumulators S/and/or the outlet E are attached to the inlets of the individual valves 1, 50 and 51 via (not shown) connecting pipes—or tubes or drill holes in the valve block 4. The stretching rod 60 can be driven through the middle main flow channel 88. The middle main flow channel is a drill hole through the valve block 4. Only the upper edge of the blow mould Bf, in which the blank V is blown, is shown, on which the blank or pre-form V and its support ring lie. A seal 89 is arranged on the blow nozzle 30, which is placed against the upper edge of the blank 5 in a sealing manner after the valve unit 5 has been lowered. Alternatively, sealing on the upper edge of the blow mould Bf or on the support ring is also possible. Equally conceivable are designing the blow nozzle 30 as movable relative to the valve block 4 and arranging block 4 together with all its valves 1, 51, 50 as stationary on the blow wheel and/or to the blow mould Bf. In particular, the second valve 51 and the outlet valve 50 have substantially the same structure and only one flow path (as drawn). On the other hand, the first valve 1 is provided with two flow paths, which is described in greater detail in the following Figures.

Figure 4:
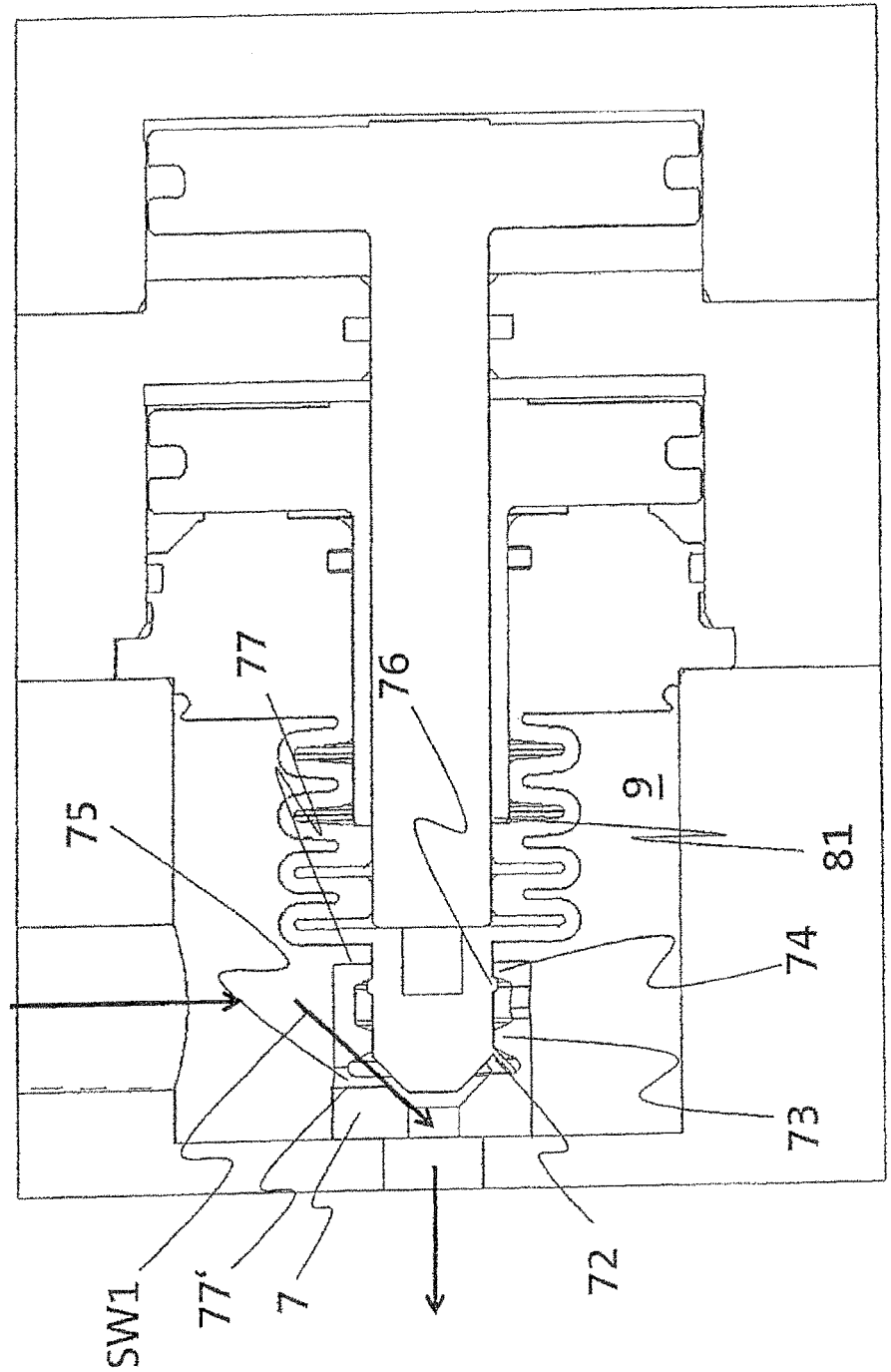
FIG. 4 shows a first operating condition of the valve in FIG. 3.
Figure 5:
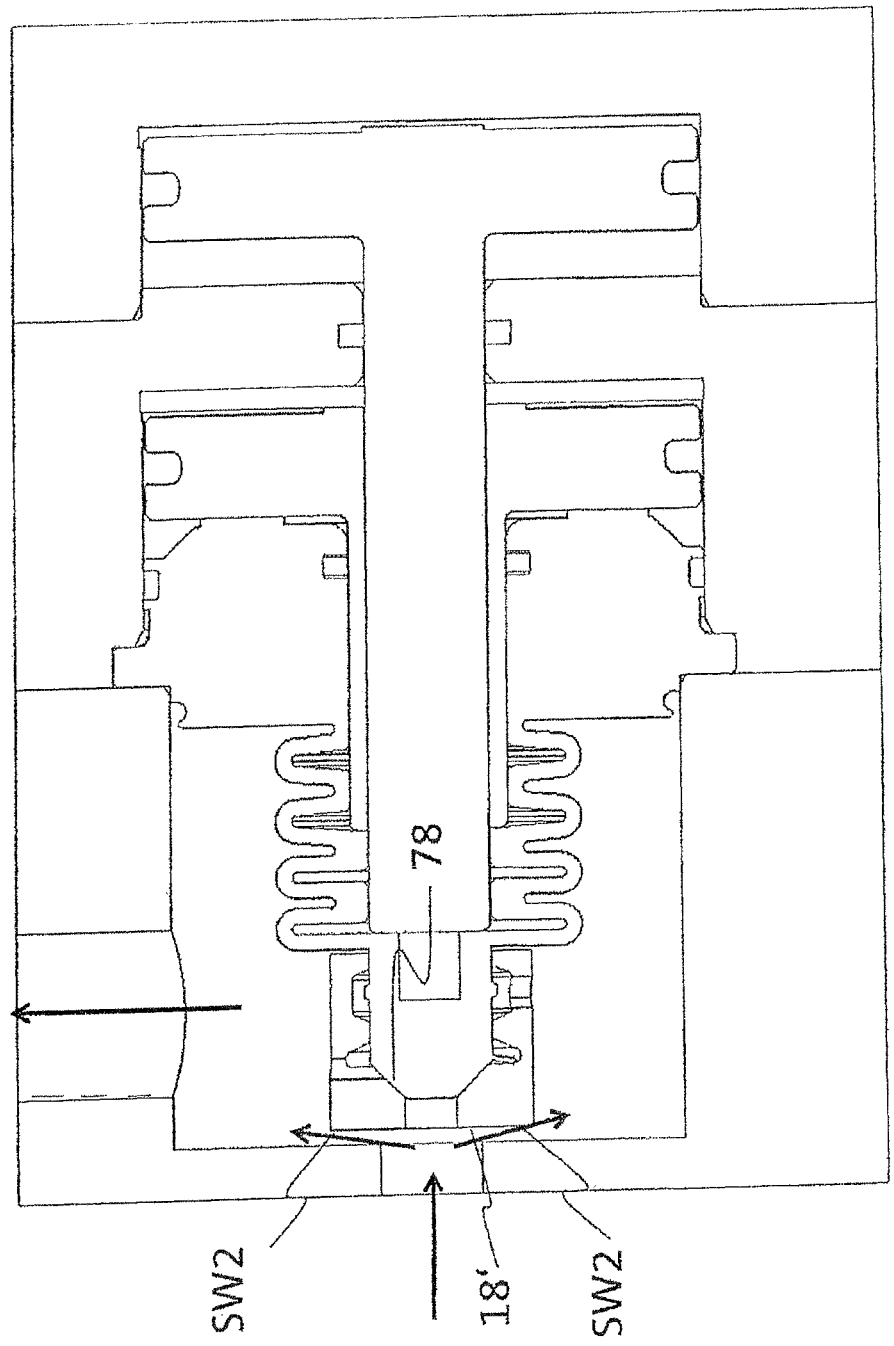
FIG. 5 shows a second operating condition of the valve in FIG. 3.
Figure 6:
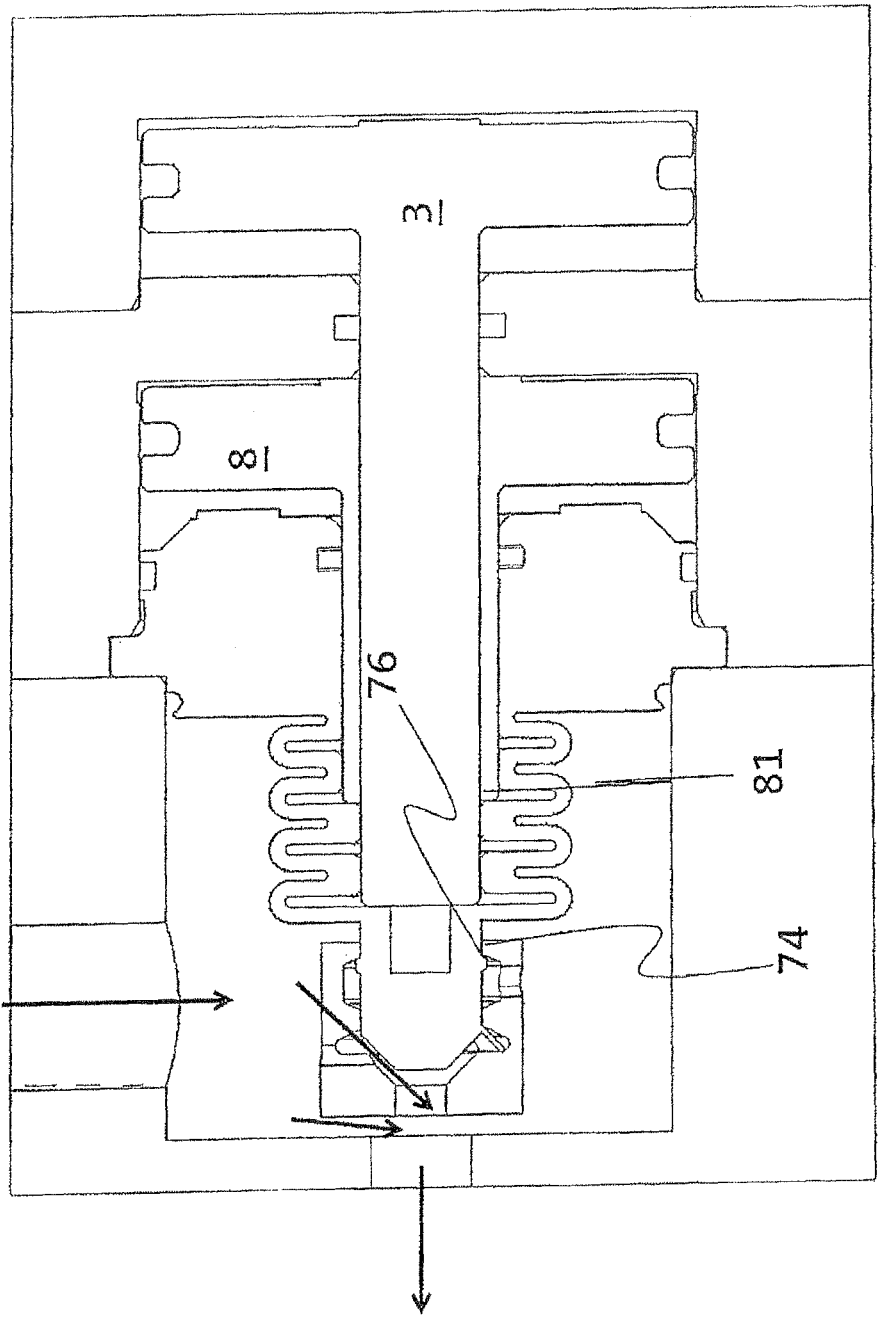
FIG. 6 shows a third operating condition of the valve in FIG. 3.

FIGS. 3 to 6 show different operating conditions of the valve, wherein, unlike in the drawings, the space between the rear destination surface 15' of the valve piston 3 and of the housing surface 11' is larger and the piston 3 in FIG. 6 is driven to a position further to the right than shown in this Figure. In the following, 'backwards' is to be seen as to the right in the respective drawing, that is, in the direction of the housing surface 11' and forwards as to the left in the Figure, that is, in the direction of the outlet A.

Figure 3:
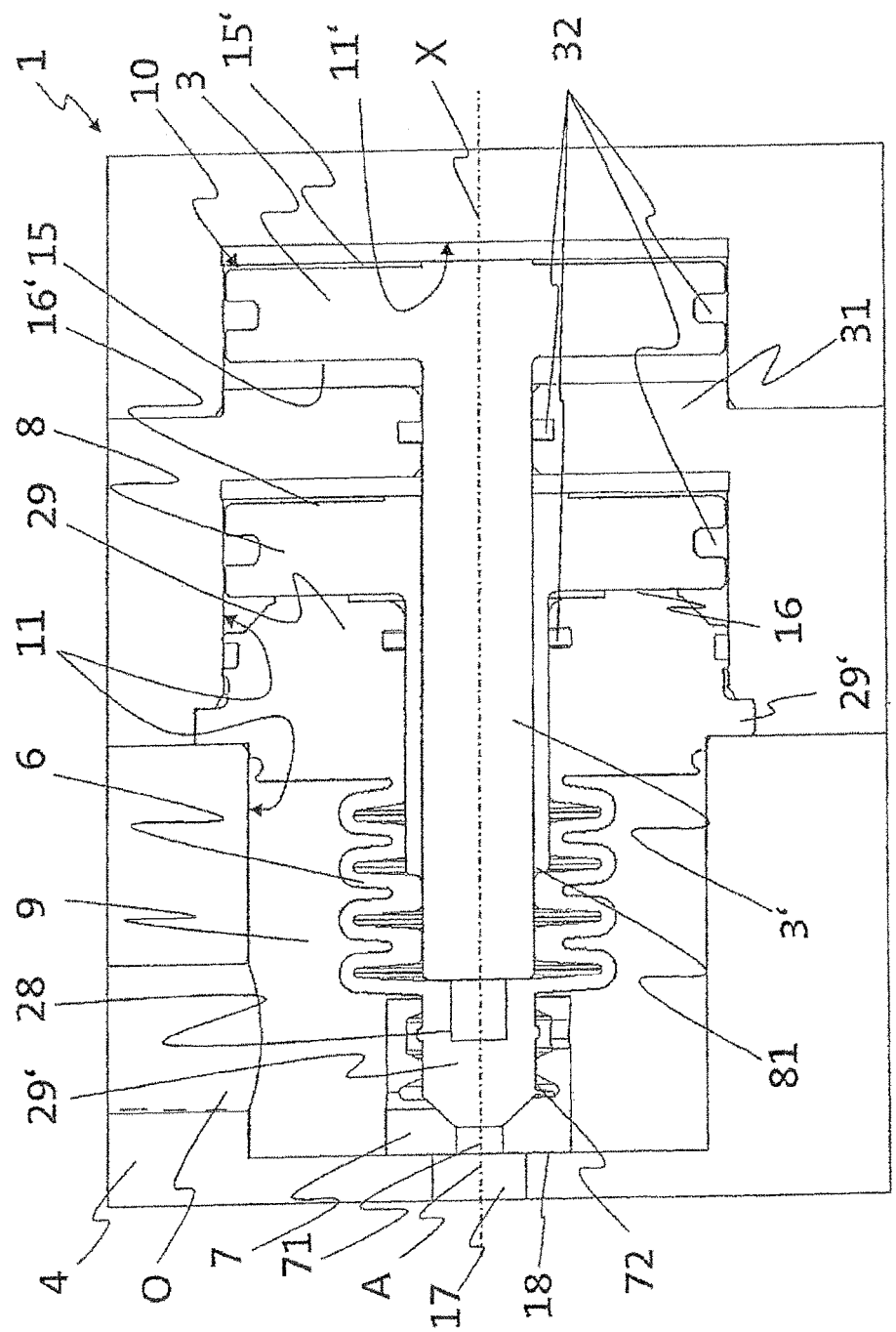
FIG. 3 shows an embodiment of the first valve according to the invention.

FIG. 3 shows an enlargement of the first valve 1 in a section view, wherein hatching lines are dispensed with for the purposes of clarity.

The switching element 10 of the valve 1 has a mushroom-shaped valve piston 3 with a cylinder-shaped piston skirt 3' and an additional element, here a sleeve 7. The valve piston 3 has bellows 6. At its front end 29' this is fixedly connected to the piston 3 via a thread 28 and, at its rear end 29, clamped firmly between two housing parts via a bead 29". Hence the folds of the bellows 6 can be stretched via a movement of the valve piston 3. It allows a total lifting in single-figure millimeters. In this Figure the bellows 6 are stretched. The bellows 6 also act like a spring, whereby their intention is to return to a compressed condition.

The piston 3 is movable relative to the housing 11 along axis X. The movement of the piston 3 is via two pilot valves (not shown) which can optionally build up both a pneumatic control pressure between a housing bead 31 and a second active surface '15 of the piston 3 and a pneumatic control pressure between the rear housing wall 11' and the first control surface 15' of the piston 3. In the illustration shown, the valve 1 is closed, control pressure now acting on the surface 15', and the pressure being removed from the space between the surface 15 and the bead 31. Hence the piston 3 is being pressed forwards in the direction of outlet A. This operating condition can be referred to as the fourth operating condition.

In sections arranged around the front end of the piston 3 and/or the bellows 29' is a sleeve 7, which is arranged as movable relative to the piston 3 along the longitudinal axis X. In the position shown, the hat-shaped sleeve is also pressed in the direction of outlet A, by the piston 3. Here the sleeve is pre-tensioned to the piston 3 and/or to the bellows 29' via a spring 72 and is pressed forwards by a spring 72. The sleeve 7 also has a restrictor bore 71 which is smaller in diameter than the outlet A and/or the channel 17 which is connected to the outlet A. The seating surface 18 between the housing 11 and the sleeve 7 encircles the channel 17.

Inside the housing 11 is the cavity 9 within which are arranged the sleeve 7 and the bellows 6 among other things. The cavity 9 is cylinder-shaped and symmetric with respect to centre axis X. The medium is guided through the cavity 9 either from the inlet O to the outlet A or the other way round, depending on whether the higher pressure prevails on the inlet side or outlet side.

A second piston 8 is arranged in the valve, which, like the piston 3, can also be pneumatically controlled via two pilot valves (not shown) on the active surfaces 16, 16'. The pilot valves of both pistons 8, 3 are connected to a control device which transmits signals to the four pilot valves in a program-controlled manner. The second piston 8 has a drill hole in its centre along the longitudinal axis X that the skirt 3' of the piston 3 can pass through. In other words, the piston skirt 3' is encircled by the second piston 8.

In contrast to the illustration, the rear active surface 16' of the second piston 8 has a larger surface than the active surface 15 and the active surface 15' of the piston 3. Thus, when the same pressure is provided by the pilot valves, the piston 8 can form a stop 81 for the piston 3, and/or the bellows 6 thereof, since it is pressed forwards with a greater force than the piston 3. In this case, the stop 81 does not necessarily have to affect the bellows 6.

In particular, a greater force is constantly applied to the second piston 8 than to the valve piston 3.

Here, in this embodiment, the bellows 6 have four folds, the stop 81 acting on the front two folds. In that case the second piston 8 supports the piston 3, to counteract the backwards movement of the bellows 6.

From forwards to backwards the individual parts are arranged in the following sequence with their respective centres of volume: the element and/or sleeve 7, bellows 6, piston 3.

Located between bellows 6 and piston 3 is particularly the second piston 8.

The pistons 3, 8 are sealed airtight via seals 32 facing each other and the housing. The bellows and/or their bead is also sealed airtight with the housing.

The bellows 6, the piston 3, the seals 32 and the second piston 8 are substantially rotationally symmetric with respect to the axis X.

In the closed operating condition shown, both pistons 3, 8 press forwards.

The centre axes of the channels of the inlet and outlet O, A are substantially vertically with respect to each other, which, in contrast to a parallelism, has the advantage of less flow resistance.

FIG. 4 shows the valve 1 in the first operating condition, during which a pre-blowing of the hollow part V is carried out. It can be seen that now the piston 3 is being pressed backwards, the second piston 8 still holding and/or stretching the two rear folds of the bellows 6 forwards. Due to the stop 81, the piston 3 is not in its rear end-position, but approx. in the middle, between both end-positions. The two front folds of the bellows 6 are compressed so far onto the stop that no further backwards movement of the piston 3 is allowed.

In this Figure the first flow path SW1, which is indicated by an arrow, is also shown. It runs between the element 7 and the switching unit 10 and/or the piston 3 and/or the bellows 6.

Since, in this process phase, a higher pressure prevails in the first pressure accumulator 3 than in the material to be formed and/or the hollow part V, the medium flows from the inlet O to the outlet A of the valve 1.

In particular, in all operating conditions in which medium flows through valve 1, medium only flows through the first flow path in the direction from the inlet O to the outlet A in the meantime.

Due to the active flow in cavity 9 and/or the active pressure on the surfaces 77, 77', in this process phase the element 7 is pressed forwards onto the seat 18.

It can be seen to a large extent that the element 7 has two stops 73, 74, by means of which it is held on the piston 3 and/or the bellows 6 thereof. In this position the stop 74 is not quite touched by the stop 76 of the piston 3, so that a force can still affect the seat 18.

In addition, a spring 72 can be provided (optionally), which additionally presses the element 7 forwards onto the seat 18.

As can be seen here, the element 7 is sleeve-shaped. Along its periphery the sleeve has several recesses which form a part of the flow path SW1. In other words, the periphery of sleeve 7 consists of several extensions which extend in parallel to the longitudinal axis X, proceeding from a ring of the sleeve on the front face. Here each extension has particularly the stops 73, 74. In particular, each extension is designed a little bendable, so that, during assembly, the stop 74 can be moved over (clipped over) the peripheral stop 76 of the piston 3. The sleeve 7 preferably consists of PEEK material. The pistons 3, 8 are substantially manufactured out of plastic. The piston skirt 3' and the bellows 6 are particularly manufactured out of different plastics.

FIG. 5 shows the second operating condition which exists when medium is being recycled. Here the arrow SW2 shows the second flow path. Since the pressure in the hollow part is higher than in the pressure accumulator S3, the medium flows from the outlet A to inlet O. The pressure acting on the seat surface 18', and/or the force acting on the seat surface 18' due to the flow rate of the medium, press the element 7 backwards here. If a spring 72 is provided, this force is greater than the force of the spring 72.

Moreover, it can be seen that, in comparison to the first operating condition, the positions of the pistons have not changed, only the position of the sleeve 7 has been changed. The second flow path runs directly between housing 11 and element 7. The first flow path is blocked by the force of the medium at the cone-shaped seating surface 78.

FIG. 6 shows the third operating condition. Now, instead of the medium which flowed through the valve in the first and in the second operating condition, a sterilising agent or cleaning agent flows through both flow paths SW1 and SW2, from the inlet O to the outlet A. Here, the element/the sleeve 7 can only be pressed forwards by the spring 72 or, alternatively, only by the sterilising agent. The stop 76 touches stop 74 here. The piston 3 is located in its rearmost position, just like the second piston 8. This is possible because the stop 81 has also moved backwards. The bellows 6 are slackened and/or compressed.

Media flow through the second flow path SW2 in different directions in different operating conditions.

In the third operating condition, recycling can be carried out optionally if the intention is to make a large cross-section available for this. Alternatively, recycling can also be carried out in a fifth operating condition (not shown) in which both pistons 3, 8 are moved into their rearmost position and the element 7 is moved backwards.

FIGS. 7 to 10 show an additional exemplary embodiment of the valve 1 described here in schematic views. Therefore, in the following, reference is only made to the differences (shown) from the above exemplary embodiment, regarding the valve 1.

Figure 7:
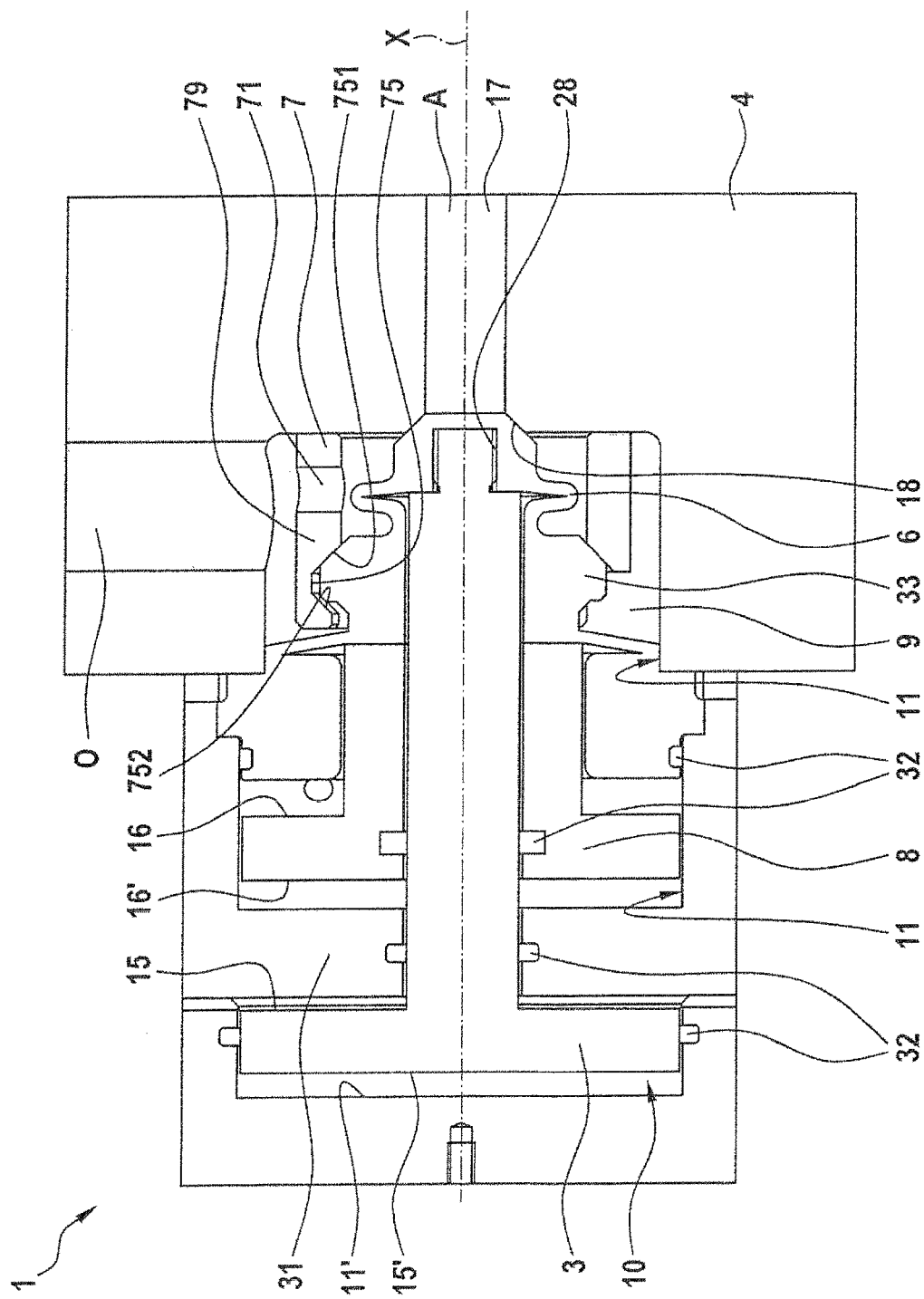
FIG. 7 shows an embodiment of the first valve in a fourth operating condition according to the invention.

In addition, FIG. 7 shows a fourth operating condition (closed condition, valve closed) of the valve 1, in which each of the flow paths SW1, SW2, SW3 is closed by a fluid-impermeable sealing of the channel (17) by the valve piston (3), a wall of the channel (17) being in direct contact with the valve piston (3) and the fluid-impermeable sealing being achieved due to this direct contact, in this operating condition.

In this case, the outer surface of the valve piston 3, in the area, which is surrounded in a direction transverse to a shifting direction X of the valve piston 3, at the side of the movable sleeve 7, forms at least one entraining element 33, particularly in the form of a projection, which is arranged in a shifting and moving manner in a corresponding inner recess 75 of the sleeve 7.

In addition, the sleeve 7 and the valve piston 3 are coupled to each other mechanically, without pre-tensioning.

Furthermore, the sleeve 7 and the valve piston 3 are only mechanically engaged via the entraining element 33.

In the fourth operating condition of FIG. 7, the entraining element 33 sits on a first seating point 751, for example the stop 73 (facing the valve seat 18) of the inner recess 75 (see first exemplary embodiment), on an inner wall particularly an inner side, of the sleeve 7.

Figure 8:
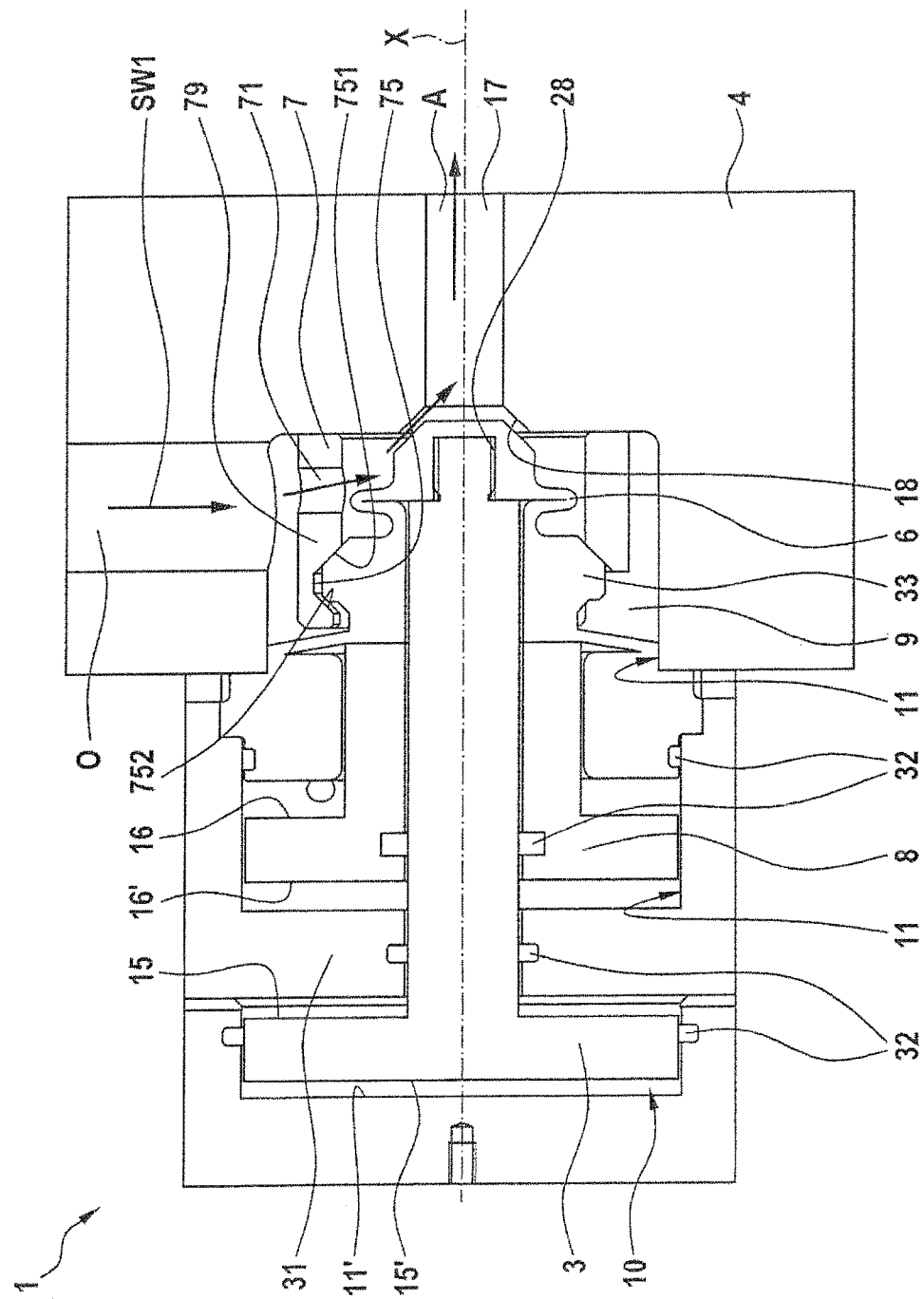
FIG. 8 shows a first operating condition of the valve in FIG. 7.

FIG. 8 shows the flow path SW1 during a pre-blowing. Therefore, in contrast to FIG. 4, the pre-blow air proceeds the inlet O to the outlet A via a side wall 79 of the sleeve 7, to reach the outlet A. In addition, the blow air, proceeding from the inlet O, is guided through a restrictor bore 71 in the side wall 79 directly to the outlet A.

Figure 9:
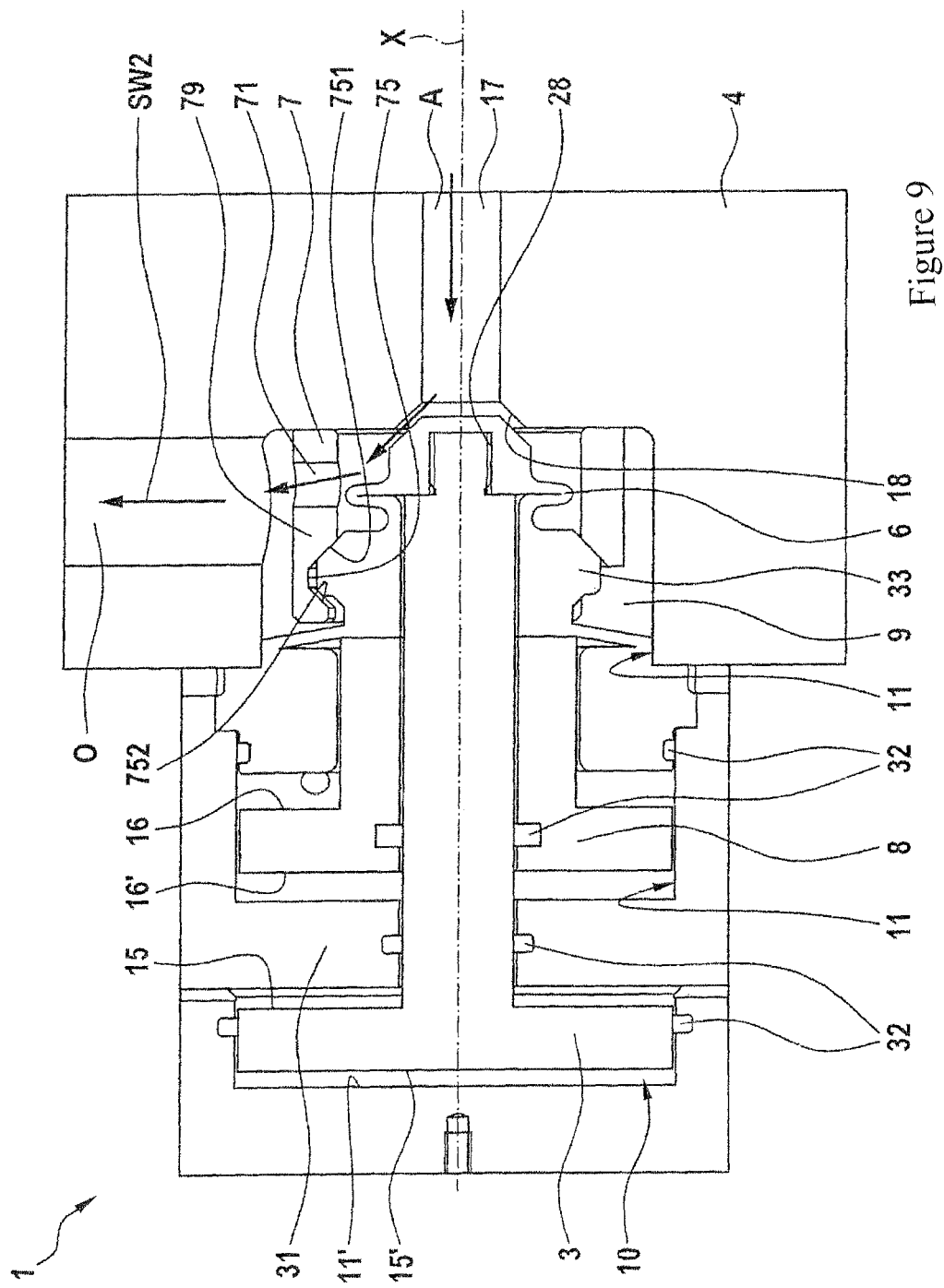
FIG. 9 shows a second operating condition of the valve in FIG. 7.

FIG. 9 shows a recyling (second operating condition) of the blow air along the flow path SW2. It can also be seen here that the air to be recycled gets to the inlet O from the outlet O and through the restrictor bore 71 in the side wall 79 of the sleeve 7.

Figure 10:
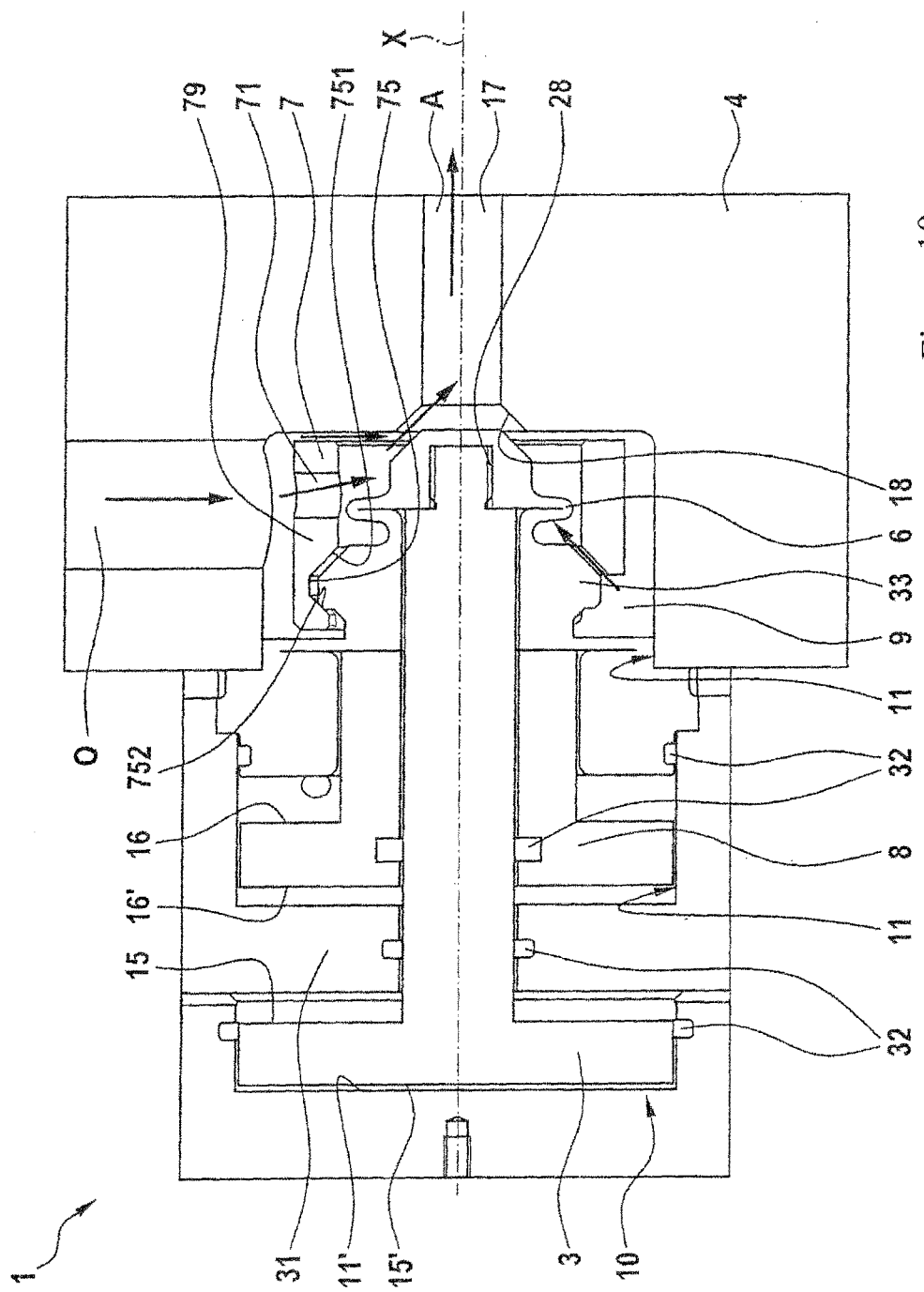
FIG. 10 shows a third operating condition of the valve in FIG. 7.

FIG. 10 shows the sterilisation (third operating condition). In this operating condition, by means of an upward movement of the valve piston 3, the entraining element 33 is brought into contact with a second seating point 752, for example the stop 74 of the inner recess 75 (see first exemplary embodiment), of the inner recess 75, such that the valve piston 3 moves the entire sleeve 7 in the direction away from the valve seat 28. The invention has been described with reference to a preferable embodiment. However, to a person skilled in the art, variations or modifications of the invention are conceivable, without departing from the scope of protection of the claims below.

The invention claimed is:

1. A hollow part manufacturing machine comprising at least one mould in which hollow parts can be manufactured by application of a pressurised medium, a valve unit having at least two valves, wherein an inlet of a second valve is connected to a second pressure accumulator, which is pressurised under a second pressure, and an outlet of the second valve is connected to a blow nozzle via a channel, wherein an inlet of a first valve is connected to a first pressure accumulator, which is pressurised under a first pressure, and an outlet of the first valve is also connected to the blow nozzle via a channel, wherein, during at least part of the moulding process, the blow nozzle seals the material to be moulded, and/or the mould, relative to the environment, wherein the first valve has a valve housing, and in the housing a cavity is formed between the inlet and the outlet, within which the medium can be supplied during the moulding process and within which at least a part of a switching element is arranged, with which an opening and closing of the first valve can be carried out, wherein that at least two flow paths, which are separated from each other by material of the housing and/or of the switching element, can be provided for the medium, between the inlet and the outlet of the first valve.

2. The hollow part manufacturing machine according to claim 1, wherein in a first operating condition of the first valve, only a first of the two flow paths is provided for the medium.

3. The hollow part manufacturing machine according to claim 1, wherein in a second operating condition of the first valve, only a second of the two flow paths is provided for the medium.

4. The hollow part manufacturing machine according to claim 1, wherein in a third operating condition of the first valve, both flow paths are provided for the medium at once.

5. The hollow part manufacturing machine according to claim 1, wherein both the flow paths have different flow cross-sections with which, in at least two operating conditions, different volume flows of the medium can be realised.

6. The hollow part manufacturing machine according to claim 2, wherein in a first operating condition, a pre-blowing can be carried out, during which the hollow part can only be expanded in part by feeding the medium, and that, during a second operating condition, a recycling can be carried out, during which a part of the medium can be guided from the preferably finally, expanded hollow part back into the pressure accumulator via the first valve, and that, in a third operating condition, a sterilisation of the flow paths can be carried out, during which both the flow paths can be sterilised by a sterilisation medium at once.

7. The hollow part manufacturing machine according to claim 1, wherein the hollow part manufacturing machine has a clean space with a low contamination-atmosphere, in which the hollow parts can be manufactured and the cavity of the first valve is connected to the clean space in the open condition of the valve, and that the switching element has bellows, via which a drive of the switching element is sealed, relative to the cavity.

8. The hollow part manufacturing machine according to claim 1, wherein the switching element has a valve piston and a movable sleeve relative to the valve piston, which, at least in some areas, is arranged between a valve seat at the outlet of the valve and the valve piston.

9. The hollow part manufacturing machine according to claim 8, wherein the first flow path runs between the sleeve and the valve piston, and the second flow path runs between the housing and the sleeve.

10. The hollow part manufacturing machine according to claim 8, wherein the sleeve is pretensioned relative to the valve piston via a spring.

11. The hollow part manufacturing machine according to claim 10, wherein the spring pretensions the sleeve away from the valve piston in the direction of the valve outlet, using a force, wherein, during a flowing back of the medium from the hollow part into the first pressure accumulator, the force of the spring is less than a force of the medium onto the sleeve in the direction of the valve piston.

12. The hollow part manufacturing machine according to claim 8, wherein the first valve has a second piston, via which a stop for the sleeve or the valve piston can be shifted, wherein, in the first and second operating conditions, the stop being moved in the direction of the outlet, causing that only one of the two flow paths can be used, and wherein, in the third operating condition, in which sterilisation gas is supplied through both flow paths, the stop is moved away from the outlet, so that both flow paths are freed.

13. The hollow part manufacturing machine according to claim 8, wherein in a fourth operating condition, each of the flow paths is interrupted by an fluid-impermeable sealing of the channel by the valve piston, wherein, in this operating condition, a wall of the channel is in direct contact with the valve piston and the fluid-impermeable sealing is achieved due to this direct contact.

14. The hollow part manufacturing machine according to claim 8, wherein in the area, which is surrounded in a direction transverse to a shifting direction of the valve piston to the side of a movable element, an outer surface of the valve piston forms at least one entraining element, which is arranged in a shifting and moving manner in a corresponding inner recess of the movable element.

15. The hollow part manufacturing machine according to claim 8, wherein the movable element and the valve piston are coupled to each other mechanically, without pre-tensioning.

16. The hollow part manufacturing machine according to claim 14, wherein the movable element and the valve piston are mechanically engaged only via the entraining element.

17. The hollow part manufacturing machine according to claim 14, wherein in the fourth operating condition, the entraining element sits on a first seating point of the inner recess on an inner wall of the sleeve, the first seating point facing the valve seat.

18. The hollow part manufacturing machine according to claim 14, wherein in the second and/or third operating conditions, the sleeve is lifted off the valve seat, by an engagement of the entraining element into a seating point of the inner recess, said seating point facing away from the valve seat.

19. The hollow part manufacturing machine according to claim 14, wherein the sleeve in a side wall has at least one restrictor bore, and wherein, in operating conditions one, two, and three, each of the assigned flow paths thereof run through this restrictor bore.

20. A method for manufacturing hollow parts in a mould by application of a pressurised medium, wherein the medium is supplied via a valve unit, which has at least two valves, to the hollow part, wherein an inlet of a second valve is connected to a second pressure accumulator, which is pressurised under a second pressure, and an outlet of the second valve is connected to a blow nozzle via a channel, wherein the inlet of a first valve is connected to a first pressure accumulator, which is pressurised under a first pressure, and the outlet of the first valve is also connected to the blow nozzle via a channel, wherein, during part of the moulding process, the blow nozzle seals the material to be moulded, and/or the mould, relative to the environment, wherein the first valve has a valve housing, and in the housing a cavity is formed between the inlet and the outlet, in which, during the moulding process, the medium is supplied and in which at least a part of a switching element is arranged, with which an opening and a closing of the first valve can be carried out, wherein the medium flows between the inlet and the outlet of the first valve through at least two flow paths, which are separated from each other by material of the housing and/or of the switching element.

21. The method according to claim 20, wherein the switching element frees either the first flow path, the second or both flow paths, depending on an operating condition of the valve, and in particular depending on the direction of flow of the medium through the cavity.

22. The method according to claim 20, wherein in a production mode, during a pre-blowing of the hollow part, the medium only flows substantially via the first flow path, and, during a sterilisation mode, sterilisation medium flows via both flow paths.

23. The method according to claim 20, wherein in a production mode, during a recycling of medium, the medium only flows substantially back into a pressure accumulator via the second flow path.

24. The hollow part manufacturing machine according to claim 7, wherein the drive of the switching element is sealed airtight.

25. The hollow part manufacturing machine according to claim 14, wherein the at least one entraining element is in the form of a projection.

26. The hollow part manufacturing machine according to claim 14, wherein the movable element is a movable sleeve.

* * * * *